US009689175B2

United States Patent
Zavitz et al.

(10) Patent No.: US 9,689,175 B2
(45) Date of Patent: Jun. 27, 2017

(54) TOWER ASSEMBLY AND METHOD FOR ASSEMBLING TOWER STRUCTURE

(71) Applicant: Tindall Corporation, Spartanburg, SC (US)

(72) Inventors: Bryant A. Zavitz, Dunwoody, GA (US); Roger C. Knox, Spartanburg, SC (US)

(73) Assignee: TINDALL CORPORATION, Spartanburg, SC (US)

( * ) Notice: Subject to any disclaimer, the term of this patent is extended or adjusted under 35 U.S.C. 154(b) by 0 days.

(21) Appl. No.: 14/172,166

(22) Filed: Feb. 4, 2014

(65) Prior Publication Data

US 2014/0215930 A1     Aug. 7, 2014

Related U.S. Application Data

(60) Provisional application No. 61/760,924, filed on Feb. 5, 2013.

(51) Int. Cl.

| | |
|---|---|
| *E04B 1/16* | (2006.01) |
| *E04B 1/20* | (2006.01) |
| *E04H 12/16* | (2006.01) |
| *H01Q 1/12* | (2006.01) |
| *F03D 13/20* | (2016.01) |
| *E04B 1/41* | (2006.01) |
| *E04H 12/10* | (2006.01) |
| *E04H 12/20* | (2006.01) |

(52) U.S. Cl.
CPC ............. *E04H 12/16* (2013.01); *F03D 13/20* (2016.05); *H01Q 1/1242* (2013.01); *E04B 1/16* (2013.01); *E04B 1/4185* (2013.01); *E04H 12/10* (2013.01); *E04H 12/20* (2013.01); *F05B 2240/912* (2013.01); *Y02E 10/728* (2013.01)

(58) Field of Classification Search
CPC ........... E04B 1/4185; E04B 2001/4192; E04B 2002/0265; E04B 1/16; E04B 1/20; E04H 12/00; E04H 12/16; E02D 27/425
USPC ... 52/135, 40, 245, 381, 382, 380, 244, 247, 52/248
See application file for complete search history.

(56) References Cited

U.S. PATENT DOCUMENTS

| | | | | |
|---|---|---|---|---|
| 273,742 | A * | 3/1883 | Kent | 266/198 |
| 1,001,273 | A * | 8/1911 | Ingraham | 52/245 |
| 1,054,085 | A * | 2/1913 | Brauchla | 52/584.1 |
| 1,077,949 | A * | 11/1913 | Anderson | 52/196 |
| 1,180,058 | A * | 4/1916 | McNutt | 52/248 |
| 1,497,141 | A | 6/1924 | Hart | |
| 1,898,380 | A * | 2/1933 | Meier | 52/271 |
| 2,074,592 | A * | 3/1937 | Rowell | 52/223.3 |

(Continued)

OTHER PUBLICATIONS

Schokker et al. Simulated Field Testing of High Performance Grouts for Post-Tensioning. Journal of Bridge Engineering. Mar. 2002. vol. 7, Issue 2. pp. 1-3.

(Continued)

*Primary Examiner* — Phi A
(74) *Attorney, Agent, or Firm* — The Tracy IP Law Firm, PLLC

(57) ABSTRACT

A structure including at least two structural components arranged to form a channel therebetween, a post tensioning element configured to compress the at least two elements with respect to each other, and a thixotropic filler material located within the channel.

9 Claims, 10 Drawing Sheets

(56) References Cited

U.S. PATENT DOCUMENTS

| | | | | |
|---|---|---|---|---|
| 2,120,838 A * | 6/1938 | Lawrence | .................. | E04H 7/28 52/248 |
| 2,275,523 A | 3/1942 | Goldbeck | | |
| 3,640,038 A * | 2/1972 | Heron | ..................... | E04H 7/20 52/223.3 |
| 3,695,044 A * | 10/1972 | Hoshino | .................. | E21D 5/012 277/654 |
| 3,709,345 A * | 1/1973 | Price | ................... | A01F 25/2009 193/34 |
| 4,015,383 A * | 4/1977 | Crowley | ...................... | 52/223.3 |
| 4,075,801 A * | 2/1978 | Alper | ....................... | E04H 7/20 52/196 |
| 4,078,354 A * | 3/1978 | Crowley | ................... | 52/745.01 |
| 4,118,909 A * | 10/1978 | Rutten | ................ | A01F 25/2009 52/196 |
| 4,122,640 A * | 10/1978 | Commins et al. | .............. | 52/248 |
| 4,126,976 A * | 11/1978 | Crowley | ...................... | 52/223.3 |
| 4,187,660 A | 2/1980 | Lin et al. | | |
| 4,249,352 A * | 2/1981 | Marchaj | ...................... | 52/167.1 |
| 4,437,279 A * | 3/1984 | Macaleese | ..................... | 52/247 |
| 4,454,693 A * | 6/1984 | Price | ..................... | B65G 65/36 52/196 |
| 4,545,701 A * | 10/1985 | Tsuzuki | ........................ | 405/153 |
| 4,588,443 A * | 5/1986 | Bache | .......................... | 106/644 |
| 4,886,550 A | 12/1989 | Alexander | | |
| 4,965,970 A * | 10/1990 | Nania | ............... | 52/82 |
| 5,265,750 A * | 11/1993 | Whiteley | ................. | F16J 10/00 220/4.26 |
| 6,167,912 B1 * | 1/2001 | Stephens | ....................... | 138/98 |
| 6,247,279 B1 * | 6/2001 | Murat | ..................... | E04C 3/34 52/223.13 |
| 7,165,578 B2 * | 1/2007 | Kamiyama | .............. | E03F 3/06 138/98 |
| 8,272,173 B2 * | 9/2012 | Jakubowski | ...................... | 52/40 |
| 2009/0031639 A1 * | 2/2009 | Cortina/Cordero | ............... | 52/40 |
| 2009/0308019 A1 | 12/2009 | Knox et al. | | |

OTHER PUBLICATIONS

PCT Search Report for PCT/US2014/014771 dated May 21, 2014.

PCT Written Opinion for PCT/US2014/014771 dated May 21, 2014.

\* cited by examiner

TOWER ASSEMBLY AND METHOD FOR ASSEMBLING TOWER STRUCTURE

CROSS-REFERENCE TO RELATED APPLICATIONS

This application claims priority under 35 U.S.C. §119 (e) to U.S. Application No. 61/760,924, filed Feb. 5, 2013, the entire content of which is incorporated into the present application by reference.

FIELD OF THE INVENTION

The present subject matter relates generally to tower structures, and more specifically to methods and apparatus for assembling tower structures.

BACKGROUND OF THE INVENTION

Construction of towers for support of various items has been practiced for many years. Various towers of various materials, including wooden, steel, and, more recently, concrete, have been provided to support, for example, electrical transmission lines. In like manner, wind driven apparatus including windmills and wind-driven power generators in various forms and designed for many purposes (including for example pumping of water from wells as well as, more recently, generation of electrical power) have also been developed.

Various apparatus are known and utilized in the tower construction and support arts to stabilize the tower structures. For example, post-tensioning devices are disclosed in Zavitz et al. (U.S. Pat. App. Pub. No. 2009/0307998), Zavitz et al. (U.S. Pat. App. Pub. No. 2009/0308006), and Knox et al. (U.S. Pat. App. Pub. No. 2009/0308019). Further examples of post-tensioning devices include Dietrich (U.S. Pat. No. 3,950,840) (disclosing a method of anchoring a ring tensioning member in a circular container); Alper et al. (U.S. Pat. No. 4,075,801) (disclosing storage tanks with walls that are prestressed by tensioned tendons disposed on the periphery thereof); Siegfried et al. (U.S. Pat. No. 5,066,167) (disclosing a prestressed concrete lining in a pressure tunnel); Siegfried et al. (U.S. Pat. No. 5,180,253) (disclosing an arrangement of prestressing tendons in a pressure tunnel); and Grossman (U.S. Pat. No. 6,588,160) (disclosing a composite structural member with pre-compression assembly).

The subject matter of each of the herein-referenced published patent-related documents is fully incorporated herein by reference, and for all purposes.

One approach to forming a tower structure is to utilize pre-cast components (such as legs or staves). These components are assembled together to form the tower structure, and post-tensioning devices and filler materials are utilized to secure the components together. However, presently known post-tensioning devices and filler materials utilized in the tower construction and support arts have a variety of disadvantages.

For example, many known post-tensioning devices, while generally providing stabilizing forces to tower structures, are entirely or substantially disposed in conduits defined internally by or placed/residing in the structural components of the tower structures. Thus, such known post-tensioning devices are difficult to initially install and join together for post-tensioning, and are also difficult to inspect. Further, because the conduits in the structural components typically are defined through a substantial portion of the width or length of the structural components, the structural components are difficult to fabricate.

Further, typically filler materials are difficult, time-consuming and expensive to utilize during construction of a tower structure. For example, typical grout materials that are utilized in tower structure construction applications require the use of extensive formwork to contain the grout while the grout is curing. Further, typical grout materials for tower structure applications, if not installed correctly, may not provide the desired structural support due to the existence of air bubbles and other defects. Additionally, the use of known post-tensioning devices and filler materials together is exceedingly difficult, due to the inability to access the post-tensioning devices as discussed above and combined with the use of a filler material that may further impede access to the post-tensioning devices. Thus, the stabilizing and structural advantages potentially provided by the post-tensioning devices and filler materials may in many cases not be fully realized.

Accordingly, improved methods and apparatus for assembling tower structures are desired in the art. In particular, improved filler materials for use in the assembly of tower structures would be advantageous. Such improved filler materials would be further particularly advantageous in combination with, for example, post-tensioning devices, and related methodology that are easy to install and inspect.

SUMMARY OF THE INVENTION

Aspects and advantages of the present subject matter will be set forth in part in the following description, or may be apparent from the description, or may be learned through practice of the present subject matter.

In view of the recognized features encountered in the prior art and addressed by the present subject matter, improved apparatus and methodology are presently disclosed for assembling tower structures, and particularly bases thereof. It should be appreciated that while the present disclosure is directed in exemplary fashion to structural components and assembly methods and apparatus therefore involving precast concrete, various presently disclosed constructions involving any suitable materials may be alternatively practiced in accordance with the present subject matter.

In addition, it should be appreciated that while the present disclosure is directed in exemplary fashion to structural components and assembly methods and apparatus therefore for windmills and similar devices, such is not necessarily a specific limitation of the present subject matter. For example, it should be clear to those of ordinary skill in the art that a tower constructed in accordance with the present technology may well be used to support, for example, a television transmitter aerial or other radio signal broadcasting aerial. Alternatively, towers constructed in accordance with the present technology may be used to support any type of device that may require placement above local ground level for more effective operation. Such other present uses may include, for example, towers for electrical power transmission lines or athletic field lighting equipment.

It is a general object of the present disclosure to provide an improved tower assembly and method for assembling a tower. It is a more specific object of the present disclosure to provide an improved filler material for use between structural components of a tower, and associated methods for assembling such towers. The use of such a filler material advantageously reduces or eliminates the need for formwork when applying the filler material between the structural components, and further reduces the risk of defects therein after curing, thus reducing the time and cost associated with assembly of the tower.

In some embodiments, it is a further object of the present disclosure to provide post-tensioning devices and associated methods for use with the present improved filler material that provide structural support to tower structures while providing ease of installation, ease of inspection, and ease of fabrication of the structural components.

Thus, the present disclosure is directed to tower assemblies and associated methodology. An exemplary assembly and methodology may be utilized with structural components, such as with concrete staves. A present exemplary tower assembly may include a plurality of structural components. Each structural component may include generally opposing exterior sidewalls. When the structural components are assembled to form a tower, such as a tower base, neighboring sidewalls of neighboring structural components generally face each other. A channel may be defined between the neighboring sidewalls, into which a filler material may be provided. Thus, a present exemplary tower assembly may further include a thixotropic filler material, which in exemplary embodiments may be a thixotropic grout. The thixotropic filler material may be provided in at least a portion of the channel defined between neighboring sidewalls of neighboring structural components, and may bond with the neighboring structural components, providing structural support and distributing loads in the tower assembly. Advantageously, the thixotropic filler material may be provided in the channel, and may maintain an exterior surface while curing, without the use of any formwork. Further, use of a thixotropic filler according to the present disclosure may reduce the risk of defects therein when cured, thus improving the structural integrity of the tower assembly.

In some embodiments, various apparatus may be included which reduce and/or evenly distribute stresses between the various structural components of a tower assembly. For example, shear keys may be provided and defined in the structural components. Portions of the filler material may be provided to and cure in the shear keys. Shear stresses may be reduced and distributed between the structural components and filler material due to use of shear keys, thus advantageously increasing the safety and life expectancy of the tower assemblies.

In some embodiments, heat transfer elements may be included in a tower assembly. Such heat transfer elements, which may be included or defined in the structural members, may advantageously allow for tower assemblies to be constructed generally year round, in a variety of hot and cold weather conditions, by heating or cooling the filler material as required to ensure consistent curing thereof.

In some embodiments, the tower assembly may further include one or more post-tensioning devices. In these embodiments, each of the structural components may generally include a plurality of inner-facing stems. Each of the stems may include a conduit, for example, such as a generally horizontal conduit therethrough. In exemplary embodiments, the conduits may be defined during pre-casting of the structural components.

Exemplary embodiments of a post-tensioning device of the present disclosure may include at least one tendon and at least one anchor, or a plurality of tendons and a plurality of anchors. The tendons may be threaded through the stems of the various structural components, such as through the conduits defined in the stems, such that the tendons generally define an inner circumference in an inner bore defined by the plurality of structural components. The tendons, other than those portions disposed within the conduits, may generally be external to the structural components and disposed within the inner bore defined by the plurality of structural components.

The tendons may be joined by anchors. A tensile force may be applied to the tendons, and the anchors may secure the tendons and maintain such tensile force. The tensile force may cause the structural components to be subjected to a circumferential compressive force, such that the structural components are forced inward towards the inner bore. Such circumferential compressive force serves to stabilize the structure.

Because the tendons and anchors are generally external to the structural components, the post-tensioning devices of the present disclosure provide structural support to tower structures while providing ease of installation, ease of inspection, and ease of fabrication of the structural components.

Further, the use of post-tensioning devices in combination with a thixotropic filler material is particularly advantageous. For example, the thixotropic filler material may be provided between neighboring structural components, and may be allowed to cure, before the post-tensioning devices are subjected to the tensile force as discussed above. When the tensile force is provided, and the structural components are thus subjected to the circumferential compressive force, the compressive forces are transmitted across and thus distributed by thixotropic filler material. Thus, the combined use of post-tensioning devices and thixotropic filler materials provides tower assemblies with significantly improved structural integrity and which are relatively efficient and inexpensive to assemble.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification. The accompanying drawings, which are incorporated in and constitute a part of this specification, illustrate embodiments of the present subject matter and, together with the description, serve to explain the principles of the present subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE PREFERRED EMBODIMENTS

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
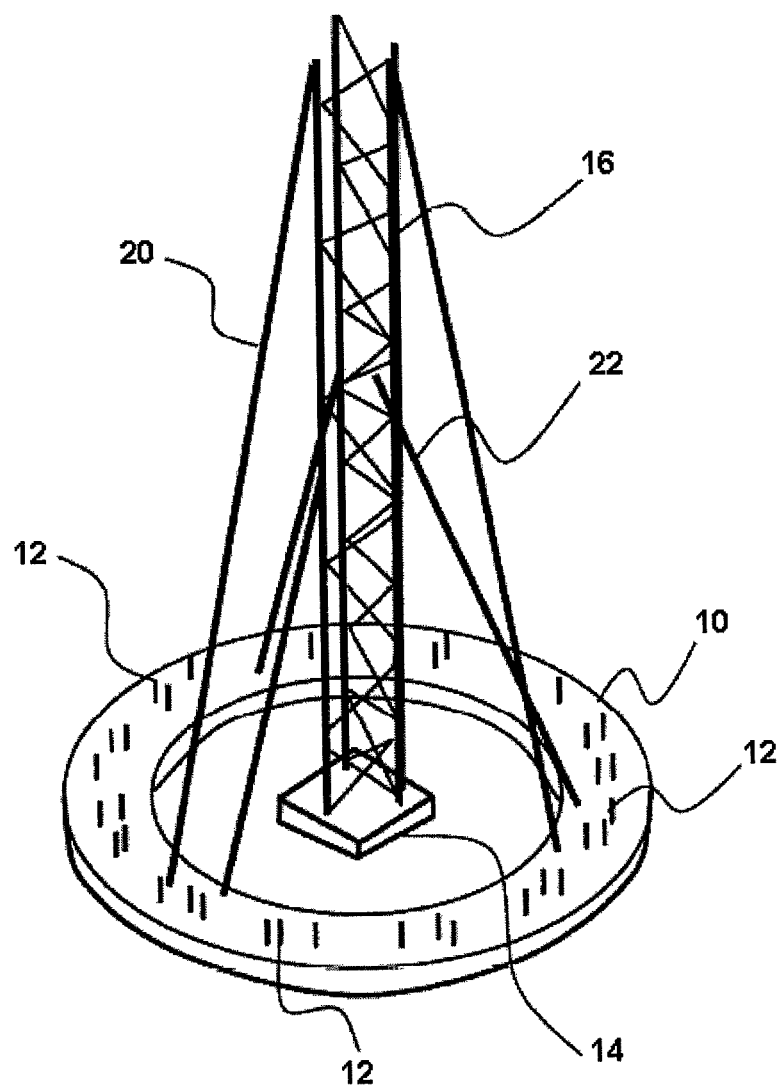
FIG. 1 illustrates a portion of a lower section of a concrete base support in accordance with an exemplary embodiment of present subject matter, illustrating a temporary support tower, guy wires, and circular concrete base support.

With reference to present FIGS. 1-4, an exemplary embodiment of a present apparatus devised as an exemplary base support for wind-driven power generators will be described. FIG. 1 illustrates a concrete base support and temporary tower construction. As shown, there is provided a concrete base 10 including embedded therein a number of anchor elements 12. Concrete base 10 may be poured in place and requires minimal or no excavation. In an exemplary configuration, concrete base 10 may be sixty feet in diameter and may be provided as a shallow foundation extending just below the frost line, perhaps two to three feet in depth. However, it should be understood that the concrete base 10 of the present disclosure is not limited to any specific shape, diameter, or depth.

A second concrete base support 14 may be rectangular and centrally positioned within an open space within the circular concrete base 10. Concrete base support 14 is large enough to provide support for temporary tower 16 which may be held in position by one or more guy wires 20, 22. It should be appreciated that while the present construction permits removal of tower 16, such tower may, nevertheless, be retained for other purposes including providing support for conductive cables associated with a wind generator, for access to the central portion of the tower above transition piece 30 (see FIG. 2), or for other purposes not directly related to the tower construction.

Figure 2:
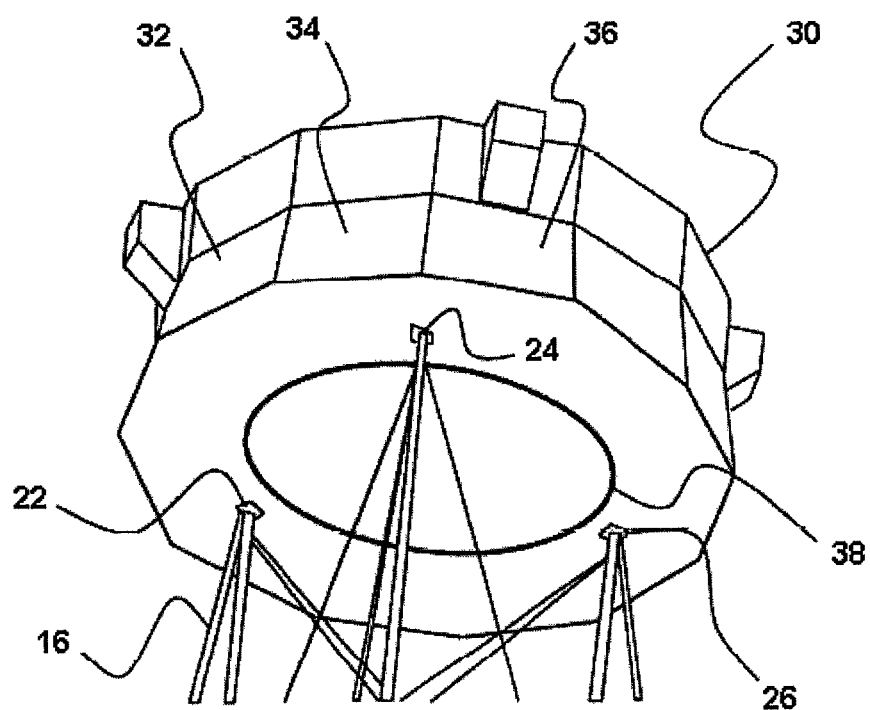
FIG. 2 is an enlarged perspective view of the top portion of the temporary tower illustrated in FIG. 1 with a concrete transition piece placed thereon.

Referring presently to FIG. 2, there is illustrated an enlarged perspective view of the top portion of temporary tower 16 illustrated in FIG. 1 with a precast concrete transition piece 30 placed thereon. Transition piece 30 may be raised into position using a crane or other suitable mechanisms and is placed on flat pads 22, 24, 26 secured to the tops of vertical sections of tower 16. Transition piece 30 simply sits in place, and is more securely positioned by placement of staves 100 (see FIGS. 3 through 9) and other securing devices (not shown).

Transition piece 30 is constructed with a multifaceted precast concrete construction to include a number of facets 32, 34, 36, where the number of facets is preferably equal to the number of staves 100 to be positioned about the perimeter of the transition piece 30. It should further be noticed that an elliptical aperture 38 is provided through the central portion of transition piece 30 and provides a passage way through transition piece 30. Elliptical aperture 38 provides for the removal of an elongated sealing plate (not shown) optionally used in certain erection procedures.

Figure 3:
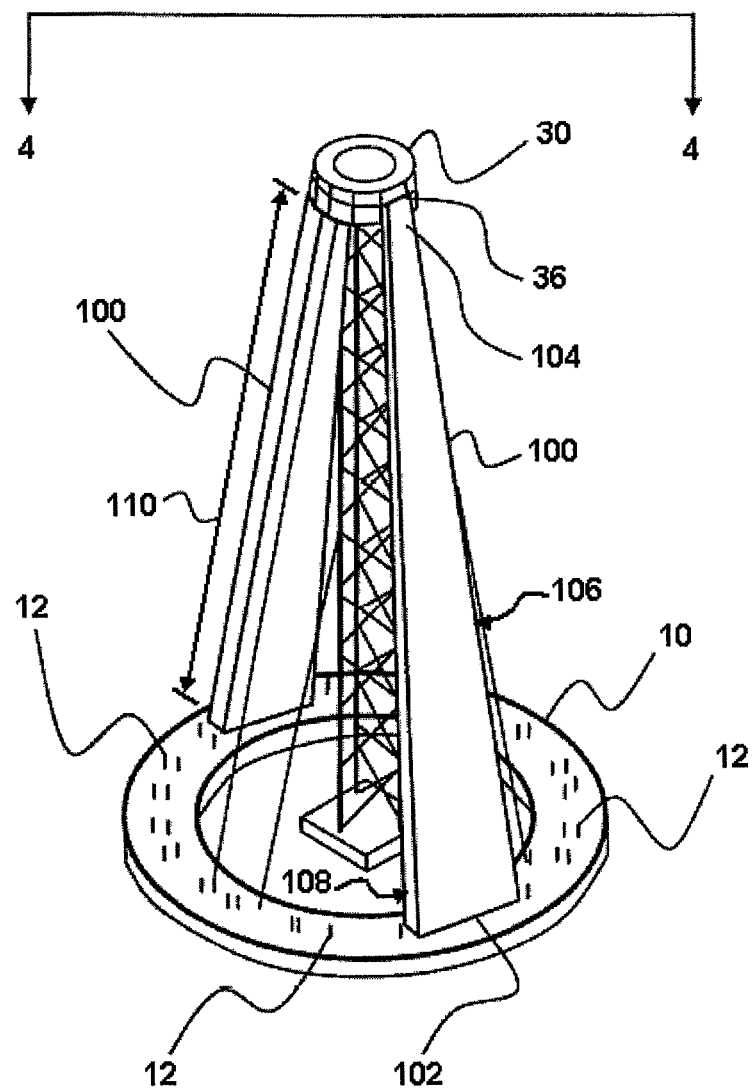
FIG. 3 illustrates the placement of an exemplary first pair of staves positioned in balanced relationship on opposite sides of the transition piece.
Figure 4:
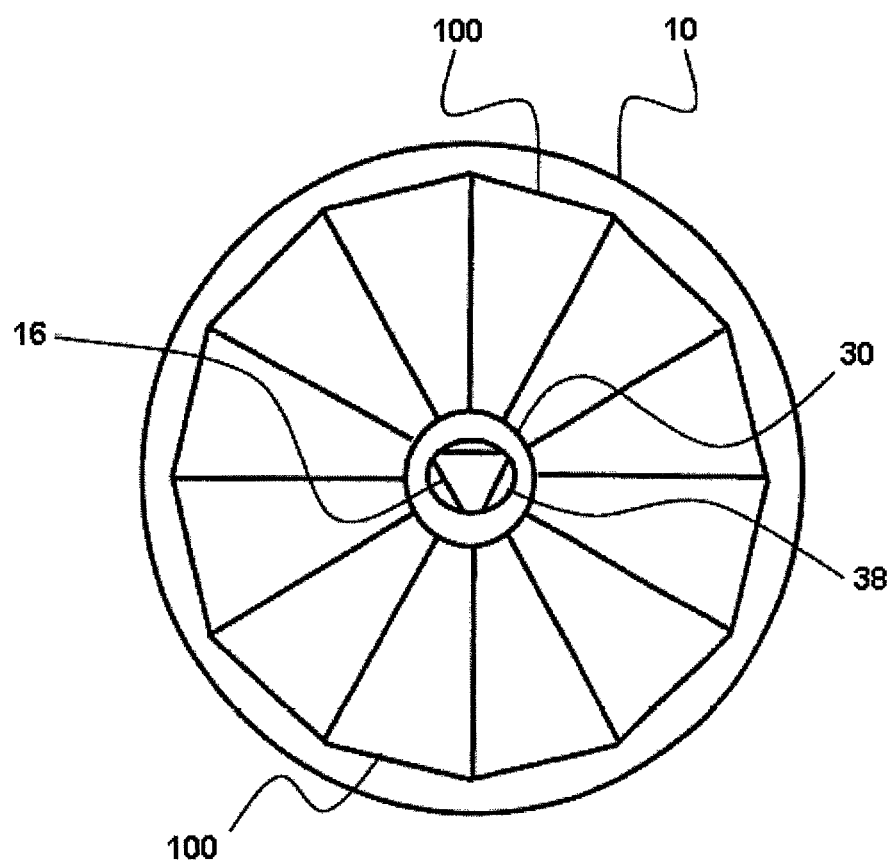
FIG. 4 is a top view taken from line 4-4 of FIG. 3 but showing a completed skirted base structure.

With reference presently to FIGS. 3 and 4, it will be seen that a number of pairs of staves 100 are positioned with a wider base portion 102 resting on concrete base 10 and a narrower top portion 104 simply leaning against a correspondingly sized facet 36 of transition piece 30. Base portion 102 may be secure against radial and lateral movement by attachment to one or more anchor elements 12. FIG. 4 illustrates a top view taken from line 4-4 of FIG. 3 but showing a completed skirted base structure including concrete base 10 and multiple pairs of staves 100 positioned at top portions thereof in contact with facets of transition piece 30. Also illustrated is elliptical aperture 38 exposing portions of temporary tower 16.

As shown in FIG. 3, each of the staves 100 may have a first exterior sidewall 106, a generally opposing second exterior sidewall 108, and a length 110. The first side 106 and second side 108 may each define the length 110 of the stave 100. Further, each of the staves 100 may include an outer wall 112 and an inner wall 114.

Figure 5:
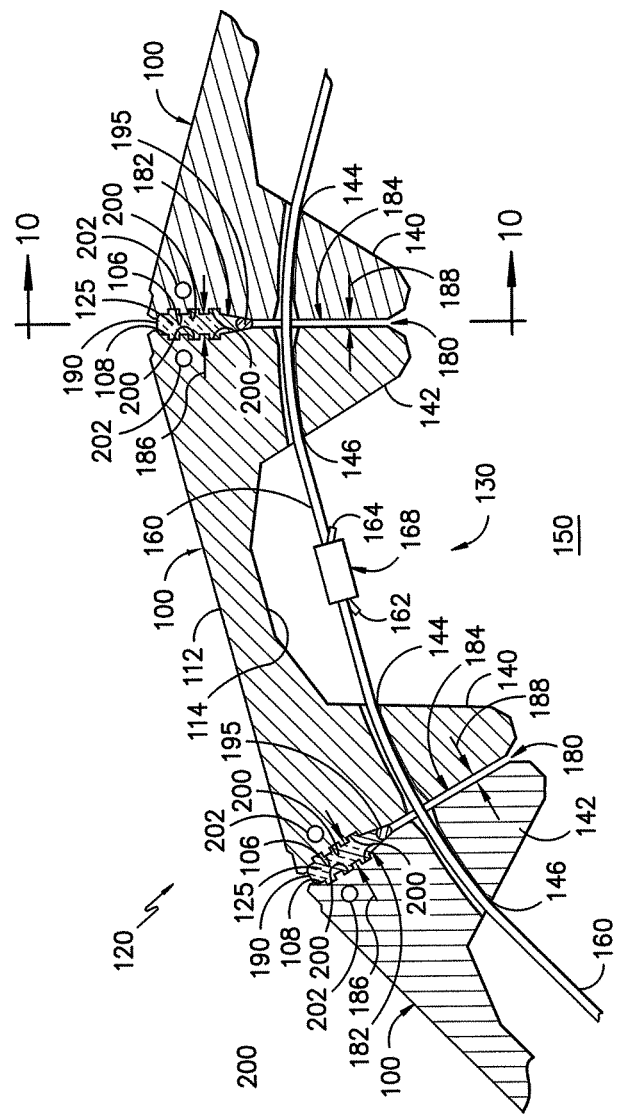
FIG. 5 is a top partial cross-sectional view of one embodiment of an exemplary tower assembly of the present disclosure.
Figure 6:
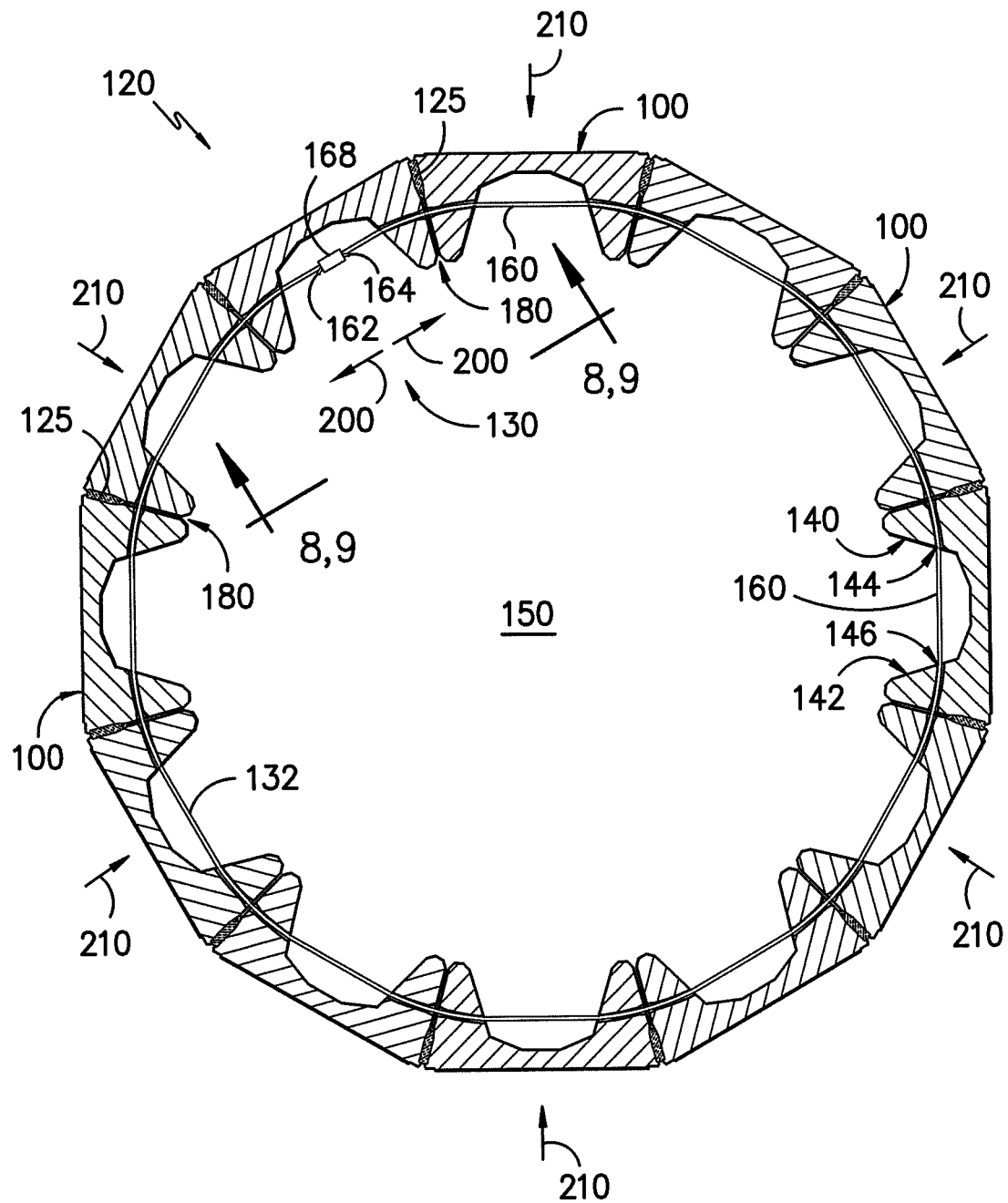
FIG. 6 is a top cross-sectional view of one embodiment of an exemplary tower assembly of the present disclosure.
Figure 7:
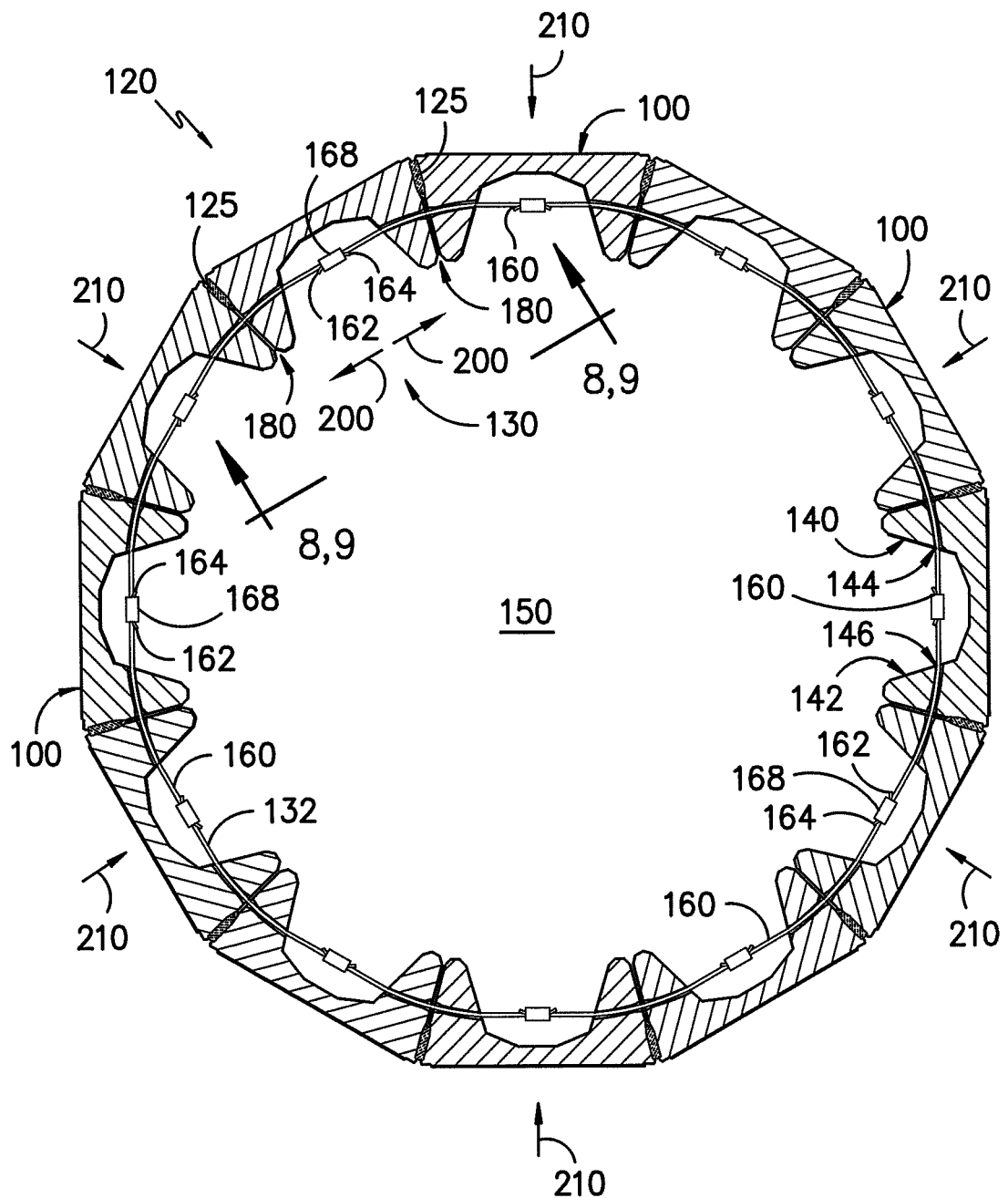
FIG. 7 is a top cross-sectional view of another embodiment of an exemplary tower assembly of the present disclosure.

With reference presently to FIGS. 5 through 10, an exemplary tower assembly generally 120, including a filler material generally 125 and post-tensioning device generally 130 of the present disclosure are shown. The tower assembly 120 generally provides improved structural integrity to the staves 100. For example, the filler material 125 provides improved assembly and bonding and reduces the risk of defects thereof. The post-tensioning device 130 causes the staves 100 to be subjected to a circumferential compressive force 210 (as generally represented in FIGS. 6 and 7) such that the staves 100 are forced generally inward, as otherwise discussed herein. This circumferential compressive force 210 may serve to stabilize the staves 100 and the structure formed by the staves 100. Further, this compressive stabilizing force may be transmitted through and thus distributed by the filler material 125. It should be understood that the tower assembly 120, filler material 125, and post-tensioning device 130 of the present disclosure are not limited to use with staves 100, but rather may be utilized with any suitable structural components. Further, the structural components need not be formed from concrete, but rather may be formed from any suitable structural material.

As shown in FIGS. 5 through 7 and 10, and as discussed above, each stave 100 may include opposing exterior sidewalls 106 and 108, an outer wall 112, and an inner wall 114. When neighboring staves 100 are placed in an assembled position adjacent to one another, as discussed and shown above, the neighboring exterior sidewalls 106 and 108 of neighboring respective staves 100 may define a channel 180 therebetween. The channel 180 may extend through the entire length 110 of the stave 100 or any portion thereof, and may further extend through the entire thickness of the stave 100 (as shown) or any portion thereof. Further, in some embodiments, the channel 180 may include an exterior portion 182 and an interior portion 184 (along the thickness of the channel between the outer wall 112 and inner wall 114 or innermost portion) having varying widths. For example, a width 186, such as a maximum width 186, of the exterior portion 182 may be greater than a width 188, such as a maximum width 188, of the interior portion 184, as shown, or vice versa. Alternatively, however, the channel 180 may have a generally singular width throughout.

A filler material 125 may be provided in the channel 180, or a portion thereof. As discussed above, in exemplary embodiments, the filler material 125 is a thixotropic filler material, such as a thixotropic grout, mortar, or epoxy. A thixotropic filler material 125 according to the present disclosure begins to gel and stiffen in a relatively short time while at rest after mixing, pumping, and/or pouring, yet when mechanically agitated, returns to a generally fluid state with a relatively lower viscosity. A thixotropic filler material 125 according to the present disclosure typically may include, for example, varying proportions of one or more of the following ingredients: cement (such as for example Portland cement), calcium aluminate, tricalcium aluminate, calcium sulfate, fly ash, slag, silica fume, meta kaolin, ultra fine fly ash, sand, synthetic fibers, water, ice, steam, water reducing admixtures, set retarding admixtures, set accelerating admixtures, and/or air entraining admixtures. Particularly suitable thixotropic filler materials 125 include cement, sand, silica fume, synthetic fibers, a water reducing admixture, a set retarding admixture, and meta kaolin. Further, some particularly suitable thixotropic filler materials 125 include between approximately 20% and approximately 30% cement, between approximately 45% and approximately 55% sand, between approximately 5% and approximately 15% silica fume, between approximately 0.1% and approximately 2% synthetic fibers, less than or equal to approximately 5% of a water reducing admixture, less than or equal to approximately 5% of a set retarding admixture, and between approximately 2% and approximately 8% meta kaolin. Still further, some particularly suitable thixotropic filler materials 125 include approximately 25% cement, approximately 50% sand, approximately 10% silica fume, approximately 1% synthetic fibers, less than or equal to approximately 2% of a water reducing admixture, less than or equal to approximately 2% of a set retarding admixture, and approximately 5% meta kaolin. When the thixotropic filler material is being provided in a channel 180, it may thus have a low enough viscosity to fill in all space within the channel 180, thus reducing or eliminating the risk of air pockets which may cause defects and instability after curing. However, the material may simultaneously have a high enough viscosity that it is generally self-standing when being provided to the channel 180. Thus, an exterior surface 190 of the filler material 125 may be maintained while the filler material 125 is being provided and before curing occurs. The need for formwork during assembly of the tower assembly 120, particularly formwork provided to define the exterior surface 190, may therefore be eliminated by the use of a thixotropic filler material 125.

Figure 10:
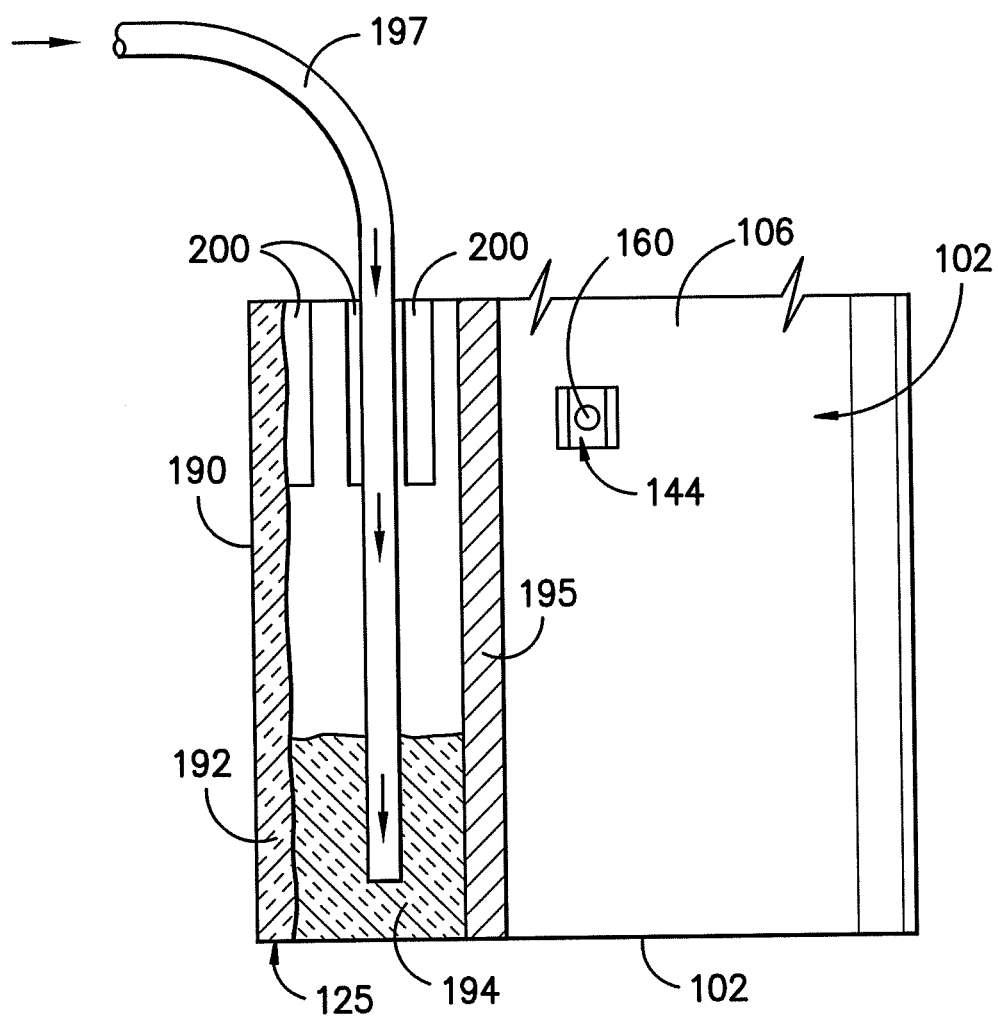
FIG. 10 is a side cross-sectional view taken from the line 10-10 of FIG. 5 of a thixotropic filler material being provided in a channel between neighboring staves according to one embodiment of the present disclosure.

As shown in FIG. 10, in some exemplary embodiments, an initial layer 192 of the thixotropic filler material 125 may be provided in a channel 180, which may form and include the exterior surface 190. An additional layer or layers 194 may then be provided in the channel 180, interior to the first layer 192. Initially providing the first layer 192 and thus forming the exterior surface 190 may facilitate the use of the thixotropic filler material 125 without formwork, as discussed above. In other embodiments, however, the thixotropic filler material 125 may be provided as a singular portion, or otherwise provided in any suitable manner.

Further, any suitable methodology may be utilized to provide the thixotropic filler material 125 in a channel 180. For example, the filler material 125 may be poured into the channel 180, or may be pumped into the channel 180, or may be otherwise provided to the channel 180. In some embodiments, as shown in FIG. 10 for example, the filler material 125 may be pumped through a hose 197 into the channel 180 in a "bottom up" manner, wherein the filler material 125 exits the hose 197 and is elevated towards the top portion 104 of the stave 100 by following filler material 125. In these embodiments, a portion of the hose 197 may remain submerged within the filler material 125 during the pumping process. Such submersion advantageously provides for complete filling of the channel 180 with grout, with reduced amounts of air pockets or voids resulting therefrom.

In some embodiments, as shown, the filler material 125 may be provided only in the exterior portion 182 of a channel 180. For example, a backer material, may be provided between the exterior portion 182 and the interior portion 184. The backer material may be a rod 195 as shown, a tape, a hose, tubing, or any other suitable barrier or backing apparatus. The backer material may provide a barrier between the interior portion 184 and the exterior portion 182, and thus prevent thixotropic filler material 125 from entering the interior portion 184. The backer material may be formed from any suitable material, such as, for example, closed cell foam, open cell foam, rubber, cloth, etc.

As shown in FIGS. 5 and 10, in some embodiments, a tower assembly 120 may further include one or more shear keys 200. A shear key 200 may be defined in a sidewall 106 or 108 of a stave 100. In exemplary embodiments, multiple shear keys 200 may be defined in a sidewall 106 or 108, and opposing shear keys 200 may be defined in the opposing sidewall 108 or 106 of a neighboring stave 100. A shear key 200 is generally a cavity defined in the sidewall 106, 108, into which a portion of the filler material 125 flows when it is provided into the channel 180. A shear key 200 may have any suitable size and shape, such as rectangular as generally shown or otherwise. Shear keys 200 may be, for example, cast into the sidewalls 106, 108 during casting of the staves 100, or otherwise defined in the staves 100 after forming thereof. Filler material 125 may flow into the shear keys 200 when provided in the channel 180, and may cure therein. Shear keys 200 may generally direct and provide a frictional path for shear stresses between the neighboring respective staves 100 through the filler material 125. Thus, shear stresses may be reduced and distributed throughout the tower assembly 120 due to use of shear keys 200. Shear keys 200 may thus advantageously increase the safety and life expectancy of associated tower assemblies.

As shown in FIG. 5, in some embodiments, one or more heat transfer elements 202 may be provided in a tower assembly 120 according to the present disclosure. Such elements 202 may, for example, be provided in staves 100, such as adjacent to walls 106, 108, or may be provided in or be components of filler material 195. The heat transfer elements 202 may further extend through the entire length 110 of a stave or filler material 195, or through any suitable portion thereof. Heat transfer elements 202 may generally heat or cool the filler material 125 when the filler material 125 is provided between staves 100 during construction of a tower assembly 120. For example, in cold weather conditions, heat transfer elements 202 may be utilized to heat the filler material 125, thus preventing premature curing thereof. In hot weather conditions, heat transfer elements 202 may be utilized to cool the filler material 125 to facilitate curing. A heat transfer element 202 may be, for example, an electrical heating or cooling element, a conduit for circulation of hot or cold liquid or gas (such as water) therethrough, or any other suitable element that may provide heating or cooling to the filler material 125. The use of such heat transfer elements 202 may thus advantageously allow for tower assemblies 120 to be constructed generally year round, in a variety of hot and cold weather conditions.

As discussed, in some embodiments, post-tensioning devices may be utilized in a tower assembly 120 according to the present disclosure. Any suitable post-tensioning devices are within the scope and spirit of the present disclosure, and may in exemplary embodiments be utilized with the thixotropic filler material 125 to provide improved structural integrity to the tower assembly 120.

In some embodiments, as further shown in FIGS. 5 through 9, each of the staves 100 may include at least one stem generally 140. Further, in some optional embodiments, each of the staves 100 may include a plurality of stems 140. For example, in exemplary embodiments, each of the staves 100 may include a first stem 140 and a second stem 142, or a plurality of first stems 140 and a plurality of second stems 142. Such exemplary stems 140, 142 may generally be portions of the stave 100 that extend from one of the walls 112, 114 of the stave 100. For example, in exemplary embodiments, the stems 140, 142 may extend from the inner wall 114 of the stave 100.

In general, the stems 140, 142, may be integral components of the stave 100. For example, the stave 100 may be molded so as to include stems 140, 142. Alternatively, however, the stems 140, 142, may be separate components that are attached to the stave 100 after or during the molding process. The stems 140, 142 may have any shape or size suitable to provide post-tensioning to the staves 100 by accommodating tendons 160 while allowing those portions of the tendons 160 not disposed in the stems 140, 142 to generally be external to the staves 100, as discussed below.

The stems 140, 142 may each define at least one conduit 144, 146 therethrough. Further, the stems 140, 142 may each define a plurality of conduits 144, 146 respectively therethrough. In exemplary embodiments, the conduits 144, 146 may be generally horizontal conduits 144, 146. Further, the conduits 144, 146 may partially define a circumference 132 of a post-tensioning device 130, as otherwise discussed herein.

Figure 8:
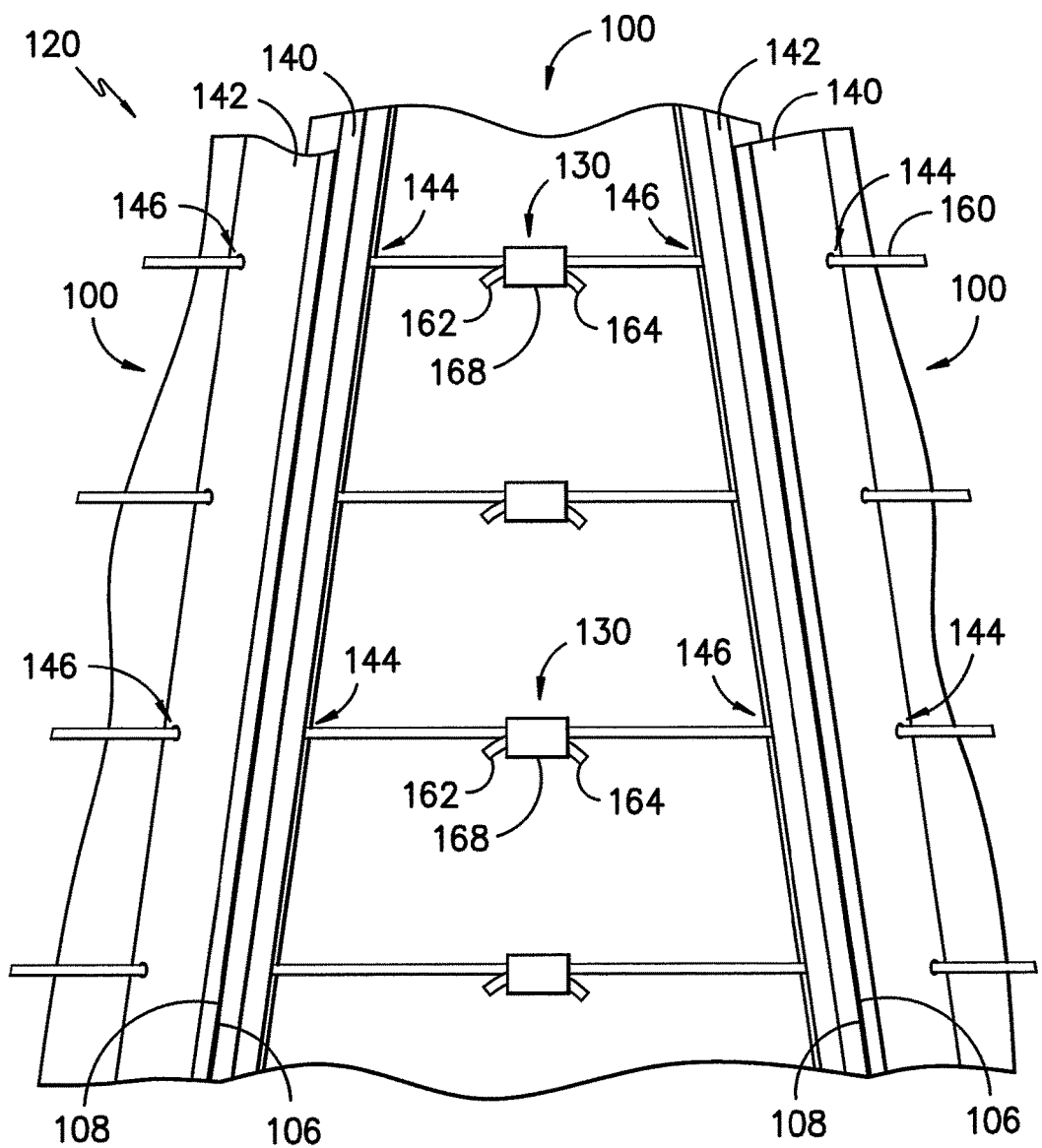
FIG. 8 is a front partial view of one embodiment of an exemplary tower assembly of the present disclosure.
Figure 9:
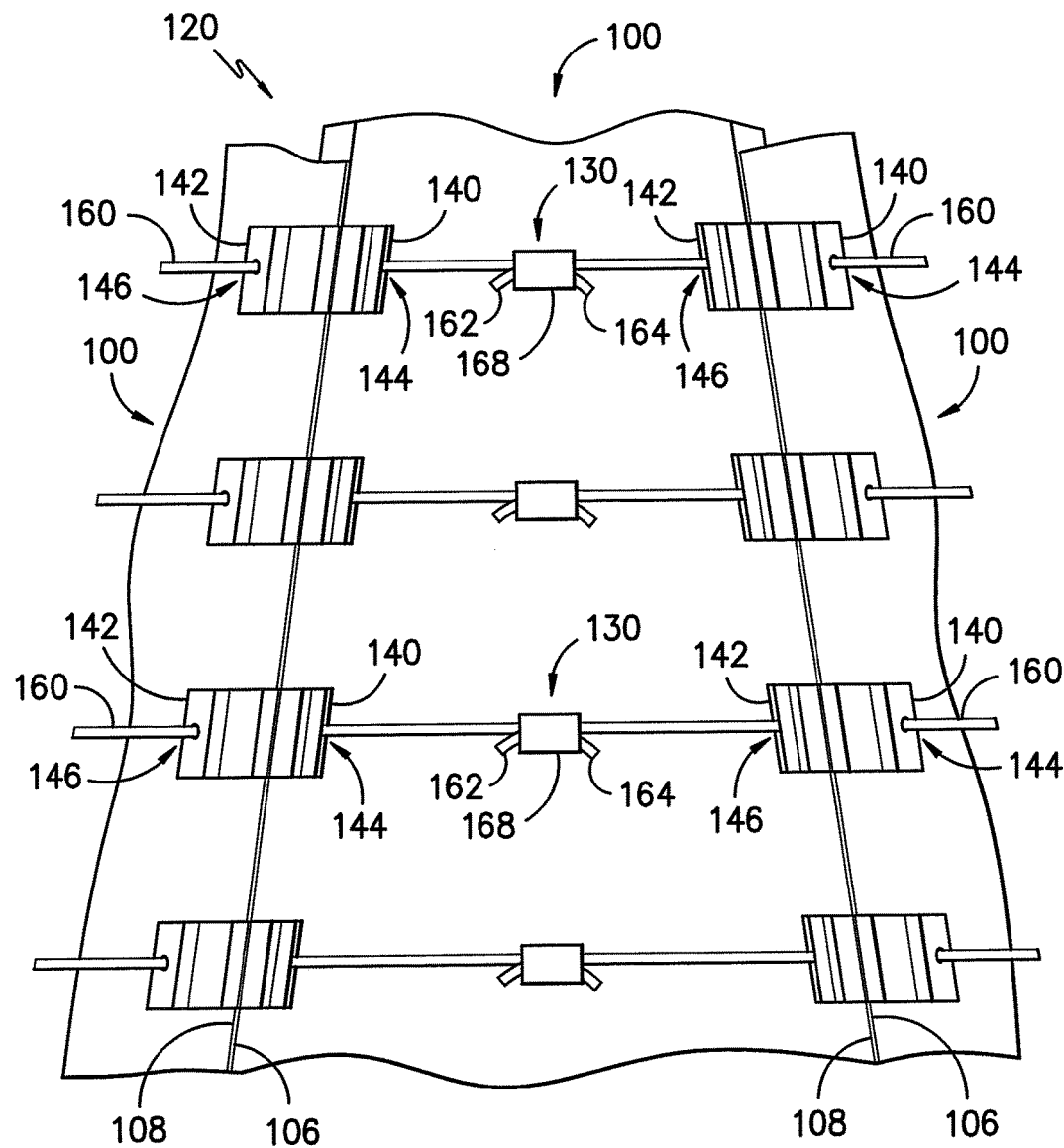
FIG. 9 is a front partial view of another embodiment of an exemplary tower assembly of the present disclosure.

The first stems 140 may be disposed on the inner wall 114 and adjacent to the first side 106 of the staves 100. In one exemplary embodiment as shown in FIG. 9, the staves 100 may each include a plurality of first stems 140, each having a conduit 144, which plurality of first stems 140 may be respectively spaced from each other along the length 110 of the staves 100. Alternatively, however, as shown in FIG. 8, the staves 100 may each include a first stem 140 that respectively spans all or a portion of the length 110 of the stave, the first stem 140 having a plurality of conduits 144 that are spaced from each other along the length 110 of the staves 100. Further, in other exemplary embodiments, the staves 100 may each include a plurality of first stems 140 having a plurality of spaced conduits 144, or a single first stem 140 having a single conduit 144.

The second stems 142 may be disposed on the inner wall 114 and adjacent to the second side 108 of the staves 100. In one exemplary embodiment as shown in FIG. 9, the staves 100 may each include a plurality of second stems 142, each having a conduit 146, and the plurality of second stems 142 may be spaced from each other along the length 110 of the staves 100. Alternatively, however, as shown in FIG. 8, the staves 100 may each include a second stem 142 that spans all or a portion of the length 110 of the staves, the second stem 142 having a plurality of conduits 146 that are spaced from each other along the length 110 of the staves 100. Further, in other exemplary embodiments, the staves 100 may each include a plurality of second stems 142 having a plurality of spaced conduits 146, or a single second stem 142 having a single conduit 146. In exemplary embodiments, the second stems 142 or the conduits 146 in the second stems 142 may be spaced from each other along the length 110 of each stave 100 such that each of the second stems 142 or conduits 146 is aligned with one of the first stems 140 or conduits 144 with respect to the length 110 of the stave 100.

As shown in FIGS. 3 through 7, a plurality of the staves 100 may be arranged to form a structure having a generally circular cross-section and defining an inner bore 150. As shown in FIGS. 5 through 9, the stems 140, 142 may protrude from the inner walls 114 of the staves 100 into the inner bore 150. The staves 100 may be arranged such that, for example, each of the first stems 140 and conduits 144 of a stave 100 is in communication with one of the second stems 142 and conduits 146 of an adjacent stave 100, and each of the second stems 142 and conduits 146 of the stave 100 is in communication with one of the first stems 140 and conduits 144 of another adjacent stave 100.

Embodiments of a post-tensioning device 130 according to the present disclosure may include at least one tendon 160 and at least one anchor 168, as shown in FIG. 6, or a plurality of tendons 160 and a plurality of anchors 168, as shown in FIG. 7. Each of the tendons 160 may respectively include a first end 162 and a second end 164. The tendons 160 may be threaded through the stems 140, 142, such as through the conduits 144, 146 defined in the stems 140, 142. For example, a tendon 160 may be threaded through one of the first stems 140 or conduits 144. The tendon 160 may further be threaded through the second stem 142 or conduit 146 of an adjacent stave 100 that is in communication with the first stem 140 or conduit 144. The tendon 160, or a second tendon 160, may further be threaded through the respective aligned second stem 142 or conduit 146 of the stave 100 and through the first stem 140 or conduit 144 of the adjacent stave 100 that is in communication with the respective aligned second stem 142 or conduit 146. Thus, the tendons 160 or plurality of tendons 160 may define a circumference 132 of the post-tensioning device 130. Tendons 160 may further be circumferentially threaded through the respective stems 140, 142 and conduits 144, 146 that are spaced throughout the lengths 110 of the staves 100, thus defining various spaced apart circumferences 132 of various post-tensioning devices 130 of the post-tensioning system 120, as shown in FIGS. 8 and 9.

The first end 162 and the second end 164 of the tendon 160 may be joined by an anchor 168, or the first and second ends 162, 164 of the plurality of tendons 160 may be respectively joined by a plurality of anchors 168. A tensile force generally 200 may be applied to the tendon 160 or tendons 160 through the ends 162, 164, and the anchors 168 may secure the tendons 160 and maintain such tensile force 200. The tensile force 200 may cause the staves 100 to be subjected to a circumferential compressive force 210, such that the staves 100 are forced inward towards the inner bore 150. Such circumferential compressive force 210 serves to stabilize the structure.

Further, in exemplary embodiments, the thixotropic filler material 125 may be provided in the channels 180 defined between the various staves 100, and may further be allowed to cure, before the tensile force 200 is applied to the tendons 160. The tensile force 200 may then be applied, and the circumferential compressive force 210 may be transmitted between the staves 100 by the cured thixotropic filler material 125. The thixotropic filler material 125 may thus advantageously distribute the forces supplied by the post-tensioning devices 130, such that the structural integrity of the tower assembly 120 is improved.

The present tower assembly 120 provides a number of advantages. For example, the use of a thixotropic filler material 125 allows for ease of assembly, and reduces or eliminates the risk of defects during assembly. The thixotropic filler material 125 additionally advantageously distributes the forces transmitted to the staves 100 by post-tensioning devices 130 that may be utilized in the tower assembly 120. With respect to the post-tensioning devices 130, because the tendons 160 are generally exposed in the inner bore 150 of the structure formed by the staves 100, rather than within conduits through the staves (not shown), the tendons 160 are easy to inspect. Further, because the tendons 160 are generally exposed, they are easy to join using anchors 168. Additionally, the staves 100 of the present disclosure are relatively easy to fabricate, because conduits 144, 146 are only required to be fabricated through the stems 142, 144, rather than between the outer and inner walls 112, 114 of the staves 100.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A structure comprising:
at least two structural components arranged to form a channel therebetween, each structural component including a shear key extending into the channel and a conduit separate from the channel;
a post tensioning element configured to compress the at least two elements with respect to each other, the post tensioning element including a tendon that runs through the conduit in each structural component and extends outside of each structural component such that the post tensioning element can be externally tensioned, each conduit surrounding and enclosing a portion of the tendon within, each structural component including a stem including the conduit configured to receive the tendon, the structural components forming a close perimeter, and each stem extends in a direction of an inside of the perimeter; and
a material located within the channel and surrounding the shear key extending from each structural component.

2. The structure according to claim 1, further comprising:
a transition piece in contact with a top end of each of the structural components.

3. The structure according to claim 2, wherein the transition piece includes a plurality of facets around a perimeter of the transition piece, the at least two structural components include a plurality of staves, and a top end of each stave is in contact with one of the plurality of facets.

4. The structure according to claim 1, wherein the post tensioning element includes an anchor, wherein the anchor connects a first end and a second end of the tendon.

5. The structure according to claim 1, wherein the stem is located on an inner wall of each structural component.

6. The structure according to claim 1, wherein a number of structural components is equal to twelve.

7. The structure according to claim 1, wherein the material is a thixotropic filler material.

8. The structure according to claim 7, wherein each structural component includes a heat transfer element configured to heat or cool the thixotropic filler material.

9. The structure according to claim 1, wherein the structural components form a closed perimeter, and the tendon runs around an inside of the perimeter.

* * * * *